United States Patent [19]

Messinger et al.

[11] Patent Number: 5,265,475
[45] Date of Patent: Nov. 30, 1993

[54] FIBER OPTIC JOINT SENSOR

[75] Inventors: Ross H. Messinger, Westminster; Jeffrey S. Schoenwald, Thousand Oaks, both of Calif.

[73] Assignee: Rockwell International Corporation, Seal Beach, Calif.

[21] Appl. No.: 880,383

[22] Filed: May 8, 1992

[51] Int. Cl.$^5$ .............................................. G01L 1/24
[52] U.S. Cl. ................................. 73/800; 73/150 A; 250/227.14
[58] Field of Search ...................... 73/800, 827, 150 A; 250/227.14, 227.15, 227.16, 227.17, 227.18, 227.19

[56] References Cited

U.S. PATENT DOCUMENTS 4,603,252  7/1986  Malek et al. ...................... 73/800 X Primary Examiner—Jerry W. Myracle
Attorney, Agent, or Firm—Terrell P. Lewis; Charles T. Silberberg

[57] ABSTRACT

The invention is a failure detecting system including fiber optic cables of different lengths disposed in the vicinity of a secured region between two or more adherends, and an electro-optical analysis circuit for analyzing signals detected by the fiber optic cables. The fiber optic cables extend transversely across the connected adherends, with each cable extending a different length so that the width of the structure is divided into discrete regions. In this way, the measurable strain can be integrated over the entire length of the fiber where the fiber remains bonded to the material. The cables are coupled to laser circuitry, detector circuitry and network analyzer circuitry, and signals from the cables are processed in the network analyzer circuitry using a Fast Fourier Transform to reduce complex frequency information to time domain representation of reflection pulses. Thereafter, they are compared with reference signals to indicate the presence and degree of disbond. Upon determination that a predetermined threshold parameter has been attained or exceeded, the system can be designed to activate an alarm as well as any corrective equipment or process. The system can be embodied as a static failure detecting system, or as a real-time system capable of generating and maintaining an updatable library of reference signals.

9 Claims, 3 Drawing Sheets

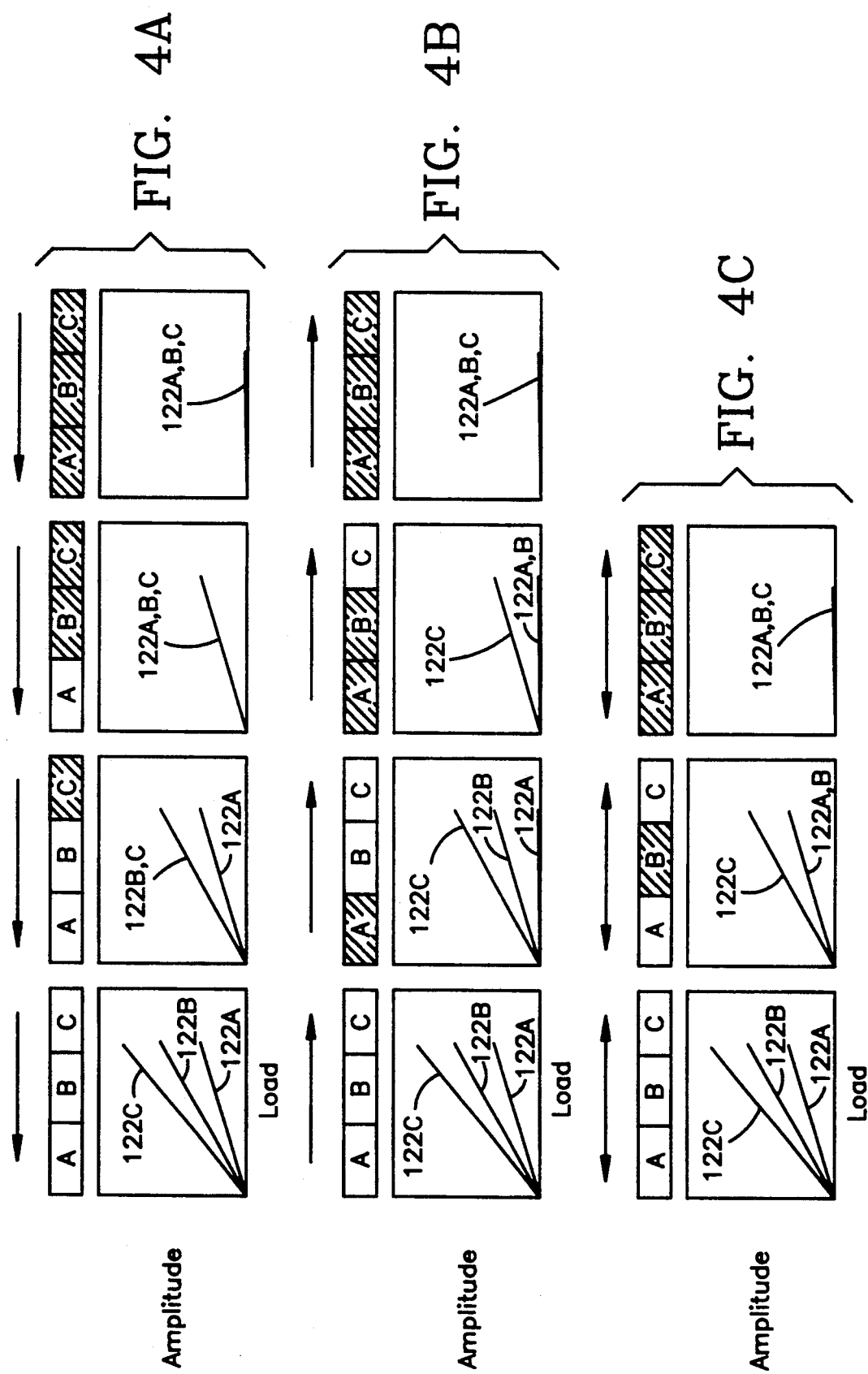

FIBER OPTIC JOINT SENSOR

BACKGROUND OF THE INVENTION

1. Field of the Invention

The present invention relates to inspection systems and methods, and more particularly to a method and an apparatus for determining integrity of critical bonded or bolted joints in aerospace hardware assemblies.

2. Background of the Invention

Considerations for developing viable aerospace transportation systems of the future will include high safety and reliability, as well as low cost and maintenance. Advanced composite structural components are likely to be a key element in realizing the greatest benefits. This is because composites offer the greatest flexibility and versatility in carrying sensors for system health monitoring and repair diagnosis.

Composite components typically incorporate bonded or bolted joints. Such joints are particularly efficient in transferring load between structural components, but in bonded joints adhesive internal shear stresses cannot be monitored. Therefore, the strength of the bonded joint, which may include unseen disbonds, is not known until failure occurs. With mechanically fastened joints, however, the failures occur as a result of fatigue, i.e., stress concentrations around the fastener hole.

Various types of sensor equipment have been contemplated for monitoring the integrity of bonded joints to detect failures, i.e., disbonds and delaminations, as well as for assessing the strength of attachment of the members. One such sensor is the strain gage, a device which is expensive to install, unreliable in harsh environments, and provides measurements only at a point.

More recently, fiber optic strain sensors have been recognized as a very attractive mechanism for performing these tasks, which include the measurement of strain, vibration and other phenomena, e.g., cracks, fatigue and delaminations. These sensors typically include fiber optic cables embedded within a laminated composite, and an optics/electronics system for generating signals used in the sensing process.

Fiber optic strain sensors possess several inherent advantages over existing inspection systems. In contrast to strain gages, which provide measurements only at a point, a fiber optic strain sensor returns an integrated strain along the fiber length. When coupled with available electronics, a single fiber can monitor, in flight, a large bonded area with unparalleled accuracy. However, successful implementation of fiber optic sensors in aerospace vehicle structures has, until now, been hampered by design, manufacturing and operability constraints.

There is, therefore, a great need for a fiber optic strain sensor system which is easily outfitted in aerospace vehicle structures and which returns an integrated strain along the fiber length. Moreover, if real-time distributed inspection of critical composite joints in aerospace structures could be achieved using networked fiber optic sensors, a significant contribution would be made in assuring the reliability and safety of this country's current and future generation of aerospace vehicles.

OBJECTS AND SUMMARY OF THE INVENTION

It is therefore an object of the present invention to provide a novel optic fiber strain sensor system for secured (i.e., bonded or bolted) composite structural assemblies and a method of using the strain sensor system to monitor secured structural composite members which will overcome all the disadvantages and drawbacks of the known systems.

Another object of the present invention is to provide a fiber optic strain sensor system which will not only determine applied load levels, but also recognize the location and size of disbonds in an adhesive layer bonding together two or more adherends, thereby improving the performance and safety of critical primary structural assemblies, such as those used in the aerospace industry.

Still another object of the invention is to provide a sensing system which, when coupled with conventional electronics, will provide in flight monitoring of a large bonded area, and will also alert as to disbonds, both with extreme accuracy.

These and other objects are accomplished by providing a failure detecting system including fiber optic cables of different lengths disposed in the vicinity of a secured region between two or more adherends, and an electro-optical analysis circuit for analyzing signals detected by the fiber optic cables. The fiber optic cables extend transversely across the connected adherends, with each cable extending a different length so that the width of the structure is divided into discrete regions. In so doing, the measurable strain can be integrated over the entire length of the fiber where the fiber remains bonded to the material. The cables are coupled to laser means, detector means and network analyzer means, and signals from the cables are processed in the network analyzer means using a Fast Fourier Transform to reduce complex frequency information to time domain representation of reflection pulses. Thereafter, they are compared with reference signals to indicate the presence and degree of disbond. Upon determination that a predetermined threshold parameter has been attained or exceeded, the system can be designed to activate an alarm as well as any corrective equipment or process.

BRIEF DESCRIPTION OF THE DRAWINGS

FIGS. 4A, 4B, and 4C illustrate, for each of three situations in which failure occurs at a distinct location in the joint, the relationship between the load carried by the regions of the joint denoted in FIG. 3 and the load amplitude at those regions as the failure travels through the joint.

DETAILED DESCRIPTION OF THE INVENTION

Figure 1:
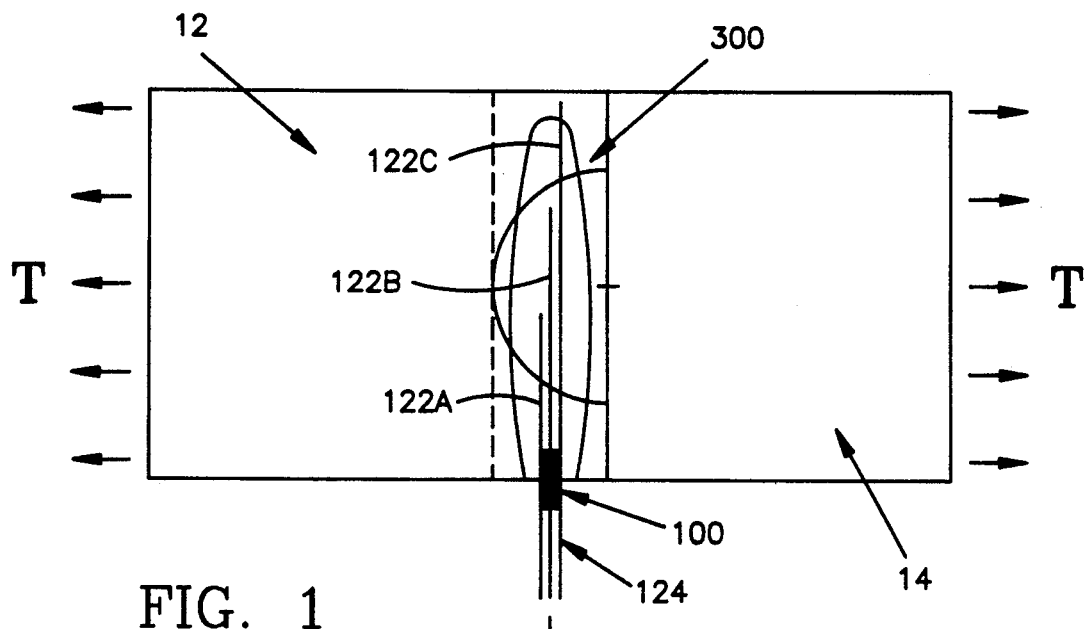
FIG. 1 is an overhead view of two composite adherends joined to one another by a layer of adhesive material, and showing in phantom the placement of the fiber optic sensor of the present invention.
Figure 2:
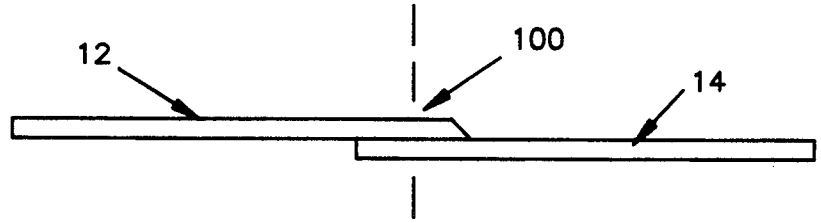
FIG. 2 is a side sectional view of the two adherends illustrated in FIG. 1, and showing two different manners of placement of the fiber optic sensor of the present invention.

Referring now to FIGS. 1 and 2, there is shown two structural adherends 12 and 14 configured as panels. These panels are attached to one another via an adhesive interface or layer, and may be comprised of any structural (rigid) material.

A fiber optic sensor system 100 is carried on the panels at the region of the attachment of the panels. This system includes a set (three are shown here by way of example only) of fiber optic sensors 122A, 122B, 122C of different, increasingly greater lengths and an appropriate set of fiber optic cables 124 coupling the sensors with signal identification and analysis means (refer to FIGS. 3 and 4A–4C and the accompanying description below). Preferably, the fiber optic sensors 122A, 122B, 122C are embedded within the material of one of the panels 12 or 14, as shown in FIG. 2. However the sensors may be secured to one of the exposed surfaces of the uppermost or lowermost adherend 12 or 14. The fiber optic cables 124 are coupled to the sensors via an appropriately chosen optical coupler, and extend away from the edge of the bonded panels to an interferometric laser and electronic system (not shown in these Figures, but depicted in FIG. 3 and discussed below) which forms part of the signal identification and analysis means. The interferometric laser and electronic system is used to determines changes in mechanical strain.

The fiber optic sensors 122A, 122B, 122C are positioned (as shown in the top view of FIG. 1 and in the side view of FIG. 3) parallel to one another and extending transversely across the connected adherends, with each sensor extending a different length across the width, so that the width of the region of the structure being monitored is divided into discrete regions, here shown as three discrete regions labelled for convenience purposes as region A, region B and region C. By taking this approach, the measurable strain can be integrated over the entire length of the sensor where the sensor has been secured to the adherend material. Through this arrangement, then, the initial failure can be identified with the highest sensitivity.

The fiber optic sensors measure the transverse strain associated with an applied axial load due to the Poisson effect. Thus, an axial tension load (T as shown in FIG. 1) will induce a transverse compressive strain in the panel material. The load between the two panels is transferred non-linearly in shear through the typical elasto-plastic adhesive.

When a failure (disbond 300 in the adhesive layer in FIG. 1) occurs in the joint, the shear stress distribution shifts since no load can be transferred through the failure. The panel tensile stress distribution also shifts as the failure increases in size. Similarly, the transverse strain in the panel above the failure is reduced, translating into a change in the phase and amplitude of the modulated laser light in the fiber optic cable. This phase change is used by the attached interferometric electronic system to determine absolute and relative strain levels.

The interferometric laser and electronic system 200 used to determines changes in mechanical strain and employed by the applicants is described below. However, it is to be understood that although the system has been described in terms of specific parameters, the present invention contemplates other systems and system parameters as well.

Figure 3:
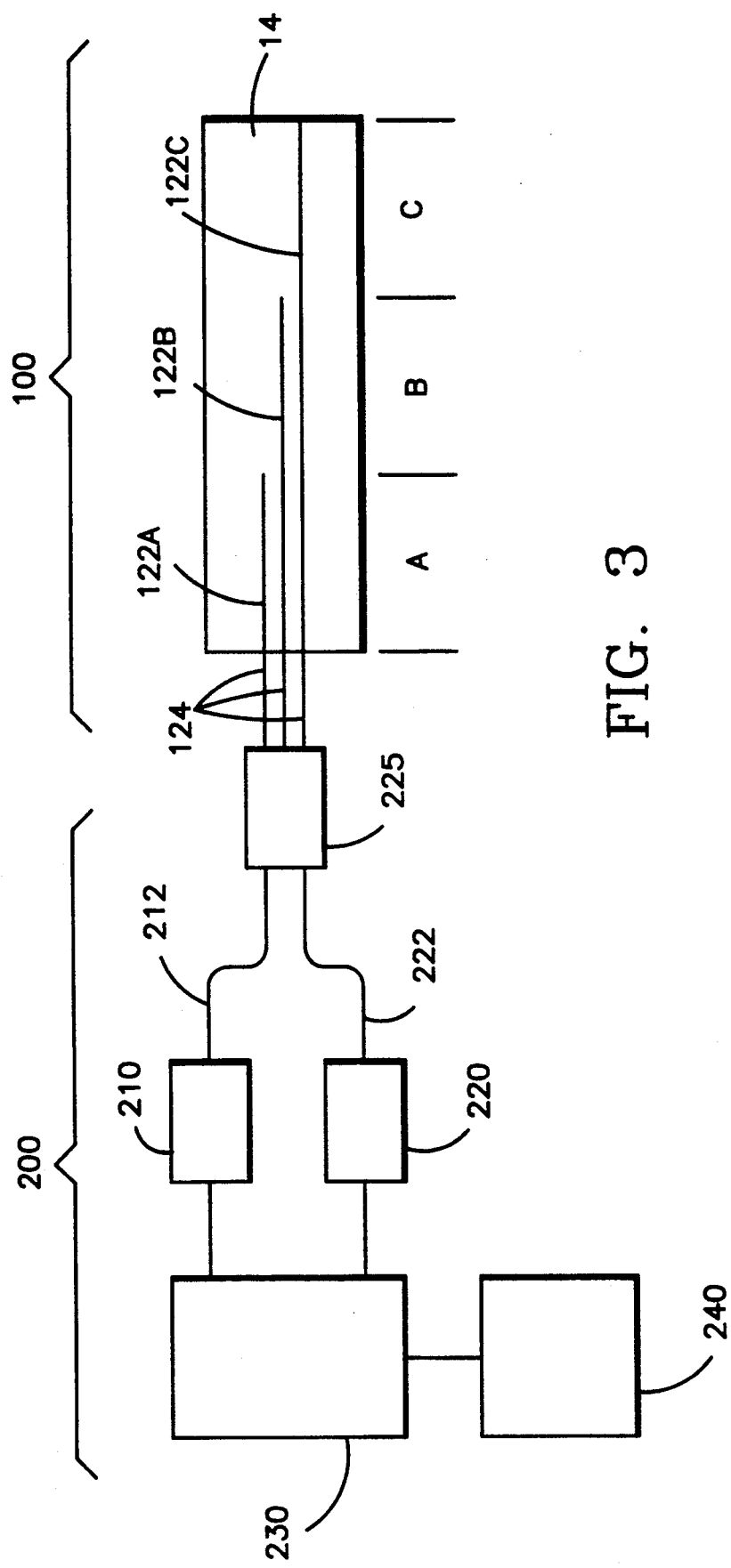
FIG. 3 is a schematic diagram of the electronic and laser circuit system coupled to the fiber optic cable sensor device.

FIG. 3 schematically illustrates the fiber optic system 100 described above and the interferometric laser and electronic system 200 used for detecting and measuring strain in the structural joint shown in FIGS. 1 and 2. As shown, the system includes a laser 210 and a detector 220 each coupled via a fiber optic coupler 225 with the fiber optic cables of FIG. 1, a network analyzer 230 interconnected with both the laser 210 and the detector 220, and a computer data acquisition and analysis mechanism 240 interconnected with the network analyzer 230.

In the electronic system employed by applicants, the network analyzer 230 provided a swept radio frequency (rf) signal from 300 KHz to 3 GHz. This signal modulated the amplitude of a high speed diode laser 210 which was supplied with an rf input port and was coupled to a multimode fiber 212 at the optical output port, which coupled the laser 210 to one input port of a 2×3 beam splitting coupler (see 225 in FIG. 3). Each of three output ports in the coupler 225 were coupled with a respective one of the three fiber optic sensors 122A, 122B, 122C embedded in one adherend as described above. Each embedded sensor was a 50 micron core/125 micron cladding step index mode fiber coated with a polyimide to a total outer diameter of 145 microns. It is contemplated that the lengths of the three sensors between the 2×3 coupler and the joint can be chosen to simplify signal processing.

The embedded sensors preferably are end coated with gold to produce a substantial reflection. The reflected light is returned through the coupler 225 and is split two ways. Only the signals associated with the fibers carrying the light from the laser to the joint and back to the detector were analyzed. A high speed detector 220 having a 50 ohm ac coupled output port was connected to the input port of the network analyzer. A transmission measurement provided a magnitude and phase record of the sum of the three optical signals, which were of different path length and therefore produced an interference pattern in the frequency domain measured from 300 KHz to 3 GHz.

Typically, the different lengths of the optical fibers produce a complex amplitude pattern. It has been found that varying the axial loading of the joint will result in a complex shifting of the phases of the reflected waves, and the resulting interference spectrum. Since interpretation of strain effects from the frequency spectrum is difficult, the network analyzer 230 employs a Fast Fourier Transform (FFT) and converts the frequency domain information to a transmission time domain representation. In effect, reflections from the fiber ends are observable as optical sources at a given distance along the optical path.

To observe strain effects in the joint using the fiber sensor assembly of the present invention, a subtraction procedure is used. As load is applied to the joint, time averaged waveforms of newly acquired time domain data (TDD) are subtracted from a reference waveform of TDD of the specimen in the zero load state by the computer data acquisition and analysis mechanism 240. These differences represent the degree to which the strained fiber endpoints have shifted relative to the unloaded state. Analog voltages provided by a load cell and an axial extensometer placed on the overlap region of the joint, when monitored by programmable digital multimeters, facilitate computation of the load and the longitudinal strain.

Failure growth over time can be observed and has shown to be of great value in using the apparatus of the present invention. Correlation between joint integrity and amplitude response is illustrated in FIGS. 4A, 4B and 4C. Each of these Figures show a series graphs depicting a changing pattern of load-amplitude curves for situations where the failure originates at one of the discrete regions A, B or C (shown in FIG. 3) and migrates from the point of failure across the width of the joint. The series of graphs therefore show how the load-amplitude curve changes as a function of failure growth. These Figures allow precise failure characterization over a period of time.

Each of FIGS. 4A, 4B and 4C present three or more graphs in horizontal array. In the graphs, the x-axis represents the load experienced by the specified fiber sensor 122A, 122B or 122C, while the y-axis represents the amplitude of the load. Atop each graph is a horizontally extending band divided into three discrete regions A, B, and C. The arrow atop these bands shows the direction of progression of the failure or disbond, it being noted that the progression of failure or disbond for each of FIGS. 4A, 4B and 4C is consistent in all graphs associated with that Figure. The shading within the bands represents the movement of the disbond or failure progressively into the designated regions of the joint shown in FIG. 3.

A more simplified approach would compare an amplitude response from each optical fiber at only one applied load level.

Several tests were performed by the inventors, to determine the effectiveness of the apparatus of the present invention. Each involved a joint fabricated according to the structure illustrated in FIGS. 1 and 2, (i.e., with optical fiber sensors embedded within the laminate). The ends of the sensors were coated to ensure high reflectivity, and exposed sensor sections were protected with Teflon tubes. The adherends were made of graphite/epoxy with a quasi-isotropic ply orientation.

The analysis was based on signal processing of the complex amplitude and phase response of the summed reflections of the radio frequency amplitude modulated light in the three optical fibers. An FFT was used to reduce the complex frequency information to a time domain representation of reflection pulses, which were tested to a proof load of 11,000 pounds.

Of three joints, one was prepared with no disbond in the joint interface, while each of the other two included a Teflon insert of a unique diameter. The three joints were each placed under tensile load, resulting in an expected lateral (transverse) contraction parallel to the optical fiber sensors.

The different degree of penetration of each fiber into the joint region was expected to result in a different degree of net strain in each fiber sensor. A $21 \times 18$ node mesh covering a $2.0 \times 1.9$ in$^2$ portion of the bonded region was modeled by finite element methods (FEM) to predict the two-dimensional stress field in the adherend as a function of disbond area in the adjacent adhesive bond placed under axial tension.

With a 1 inch disbond, results showed that the transverse strain field remained unchanged only at the greatest distance from the disbond. Compared to a no-disbond case, strain generally decreased near the disbond due to the lower total applied load. Adjacent to the disbond itself, however, compressive strain rapidly increased, caused by the elongation of the unloaded area in the axial direction.

Results of a 2 inch disbond showed further accentuation of the effects observed in the 1 inch disbond analysis. While the transverse strain field remained unchanged at the greatest distance from the disbond, strain decreased rapidly near the disbond due to the lower total applied load, and in fact became positive "below" the disbond due to the eccentricity between applied loads to one side of the disbond and reaction along the lower edge. Adjacent the unloaded disbond area, a high compressive strain is again caused by the elongation of the unloaded area in the axial direction, which included a displacement of the disbond area in the transverse direction. Along the fiber sensors, strain levels again remained substantially unchanged over the entire width of the model. But major shifts were observed near the edge of the adherend or below the disbond. Thus the optimum location of the optic fibers was determined to be at either of these two locations, rather than at the center of the bond, to provide greater induced strain changes.

While certain representative embodiments and details have been shown for the purpose of illustrating the invention, it will be apparent to those skilled in this art that various changes and modifications may be made therein without departing from the spirit or scope of this invention. For example, although the foregoing discussion is directed primarily to adhesively bonded joints, the invention (including the monitoring system, the method and the fiber optic sensors) is equally applicable to bolted joints.

What we claim is:

1. A sensor system for detecting failures at a secured region between two adherends, said system comprising:
   a set of fiber optic sensors disposed in the vicinity of said secured region between said two adherends, said fiber optic sensors being positioned at spaced locations across the width of said adherends, and fiber optic coupler means including cables interconnecting the sensors with said coupler means;
   laser emitting and detecting means connected with said coupler means, and capable of sending signals to and receiving signals from said coupler means;
   signal analyzing means coupled to said detecting means for reducing said received signals to identifiable information, and
   means for comparing said identifiable information with reference information to determine whether a failure has occured at said secured region between said two adherends.

2. The sensor system of claim 1, wherein said set of fiber optic sensors comprises sensors of increasingly greater length extending transversely across said adherends, with each sensor extending a different length so that the width of the region of the joint being monitored is divided into discrete regions.

3. The sensor system of claim 2, wherein each sensor provides a signal uniquely associated with the width of the region of the joint being monitored, and said signal analyzing means includes means for processing said uniquely associated signals to provide a real-time amplitude and phase record of the sum of the optical signals against which newly-obtained identifiable information can be compared.

4. The sensor system of claim 1, wherein said secured region comprises an adhesively bonded region.

5. The sensor system of claim 1, wherein said secured region comprises a bolted region.

6. The sensor system of claim 1, wherein said comparing means further includes means for assessing the growth characteristics of the failure, whereby the failure and its rate of growth can be identified.

7. The sensor system of claim 1, wherein said detecting means detects signals indicative of strain.

8. A method of determining the presence of failures in secured regions of connected substrates, said method comprising:
   providing a set of fiber optic sensors and disposing said set in at least one of said connected substrates, coupling said set of sensors to laser emitting means, whereby optical signals are sent to said sensors, detecting said optical signals as they are received from said sensors, coupling said laser detecting means to signal analyzing means, said signal analyzing means converting said detected signals to identifiable information, and continuously comparing said identifiable information with reference information to determine whether a failure has occured in a secured region of said connected substrates.

9. The method of claim 8, wherein said step of comparing said identifiable information with reference information comprises updating said reference information by continuously analyzing said received optical signals and maintaining a running record of phase and amplitude of said signals.

* * * * *